(12) United States Patent
Kim et al.

(10) Patent No.: US 8,259,260 B2
(45) Date of Patent: Sep. 4, 2012

(54) REFLECTIVE DISPLAY DEVICES AND METHODS OF MANUFACTURING THE SAME

(75) Inventors: Joo-young Kim, Suwon-si (KR);
Byong-gwon Song, Seoul (KR); Jae-eun Jang, Seoul (KR); Yong-wan Jin, Seoul (KR); Jung-woo Kim, Hwaseong-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 109 days.

(21) Appl. No.: 12/662,573

(22) Filed: Apr. 23, 2010

(65) Prior Publication Data
US 2011/0134373 A1 Jun. 9, 2011

(30) Foreign Application Priority Data
Dec. 4, 2009 (KR) .................. 10-2009-0119908

(51) Int. Cl.
*G02F 1/1334* (2006.01)
(52) U.S. Cl. ............................................ 349/93; 349/83

(58) Field of Classification Search .................. None
See application file for complete search history.

(56) References Cited

U.S. PATENT DOCUMENTS 5,680,185 A * 10/1997 Kobayashi et al. ............. 349/88
6,924,856 B2 * 8/2005 Okumura et al. ............... 349/96

* cited by examiner

*Primary Examiner* — Sarah Hahm
(74) *Attorney, Agent, or Firm* — Harness, Dickey & Pierce, PLC

(57) ABSTRACT

A reflective display device may include pixels. Each pixel may include sub-pixels. Each sub-pixel may include first and second substrates spaced apart from each other; a driving unit formed on a top surface of the first substrate; a reflective layer, acting as a first electrode to which a voltage is applied by the driving unit, disposed above the driving unit; a second electrode formed on a bottom surface of the second substrate; a color filter layer disposed between the reflective layer and the second electrode; and a polymer dispersed liquid crystal (PDLC) layer. If the color filter layer is formed on the reflective layer; then the PDLC layer may be disposed between the second electrode and color filter layer. If the color filter layer is formed on a bottom surface of the second electrode, then the PDLC layer may be disposed between the reflective layer and color filter layer.

16 Claims, 4 Drawing Sheets

REFLECTIVE DISPLAY DEVICES AND METHODS OF MANUFACTURING THE SAME

CROSS-REFERENCE TO RELATED APPLICATION(S)

This application claims priority from Korean Patent Application No. 10-2009-0119908, filed on Dec. 4, 2009, in the Korean Intellectual Property Office (KIPO), the entire contents of which are incorporated herein by reference.

BACKGROUND

1. Field

Example embodiments relate to display devices. Also, example embodiments relate to reflective display devices and/or methods of manufacturing the same.

2. Description of the Related Art

Since reflective display devices may not include a backlight unit, the quality of the reflective display devices may be increased when an aperture ratio is high, aside from basic characteristics, such as high reflectivity and/or high contrast ratio. However, when a driving unit including a thin film transistor (TFT) and/or a storage capacitor may be disposed on the same plane as a pixel electrode, the TFT and/or the storage capacitor may be disposed within a limited area. As a result, the ability to increase the aperture ratio may be limited.

Specifically, when a TFT having a relatively low mobility, for example, an organic TFT (OTFT) or an amorphous silicon TFT (a-Si TFT), is used to manufacture a reflective display device, such as a polymer dispersed liquid crystal display (PDLCD), a channel width of the TFT and/or an electrode area of a storage capacitor may be increased in order to increase performance of the TFT. However, when the TFT and/or the storage capacitor are disposed on the same plane as a pixel electrode, the increasing of the channel width and/or the electrode area of a storage capacitor may result in the reduction of aperture ratio, and thus a high quality reflective display device may not be realized.

SUMMARY

Example embodiments may provide reflective display devices and/or methods of manufacturing the same.

Additional aspects will be set forth in part in the description which follows and, in part, will be apparent from the description, or may be learned by practice of example embodiments.

According to example embodiments, a reflective display device may include a plurality of pixels. Each pixel may include a plurality of sub-pixels. Each of the plurality of sub-pixels may include first and second substrates spaced apart from each other; a driving unit formed on a top surface of the first substrate; a reflective layer constituting an electrode to which a voltage is applied by the driving unit, disposed above the driving unit, and reflecting incident light; a color filter layer formed on the reflective layer; a transparent electrode formed on a bottom surface of the second substrate; and/or a polymer dispersed liquid crystal (PDLC) layer disposed between the transparent electrode and the color filter layer.

A passivation layer may be formed on the first substrate to cover the driving unit. The reflective layer may be formed on the passivation layer.

The reflective layer may be a metal thin film. An uneven layer may be formed on a top surface of the passivation layer. The reflective layer may be formed on the uneven layer.

The driving unit may include a thin film transistor (TFT) and/or a storage capacitor. The TFT may be an organic TFT, an amorphous silicon TFT, a polysilicon TFT, or an oxide TFT. The first substrate may be a transparent or opaque substrate. The second substrate may be a transparent substrate through which ultraviolet rays may penetrate. The first and second substrates may be plastic substrates. The driving unit may include an organic TFT.

According to example embodiments, a method of manufacturing a reflective display device may include forming a driving unit on a first substrate, and forming a passivation layer to cover the driving unit; forming a reflective layer on the passivation layer, and forming a color filter layer on the reflective layer; disposing a second substrate on which a transparent electrode is formed to be spaced apart from the first substrate; filling a space between the color filter layer and the transparent electrode with a mixed solution comprising a liquid crystal and a photopolymerizable material; and/or forming a polymer dispersed liquid crystal (PDLC) layer by irradiating ultraviolet rays on the mixed solution.

The ultraviolet rays may be irradiated from an upper portion of the second substrate.

According to example embodiments, a reflective display device may include a plurality of pixels. Each pixel may include a plurality of sub-pixels. Each of the plurality of sub-pixels may includes first and second substrates spaced apart from each other; a driving unit formed on a top surface of the first substrate; a reflective layer constituting an electrode to which a voltage is applied by the driving unit, disposed above the driving unit, and reflecting incident light; a transparent electrode formed on a bottom surface of the second substrate; a color filter layer formed on a bottom surface of the transparent electrode; and/or a polymer dispersed liquid crystal (PDLC) layer disposed between the reflective layer and the color filter layer.

According to example embodiment, a reflective display device may include a plurality of pixels. Each of the plurality of pixels may include a plurality of sub-pixels. Each of the plurality of sub-pixels may include first and second substrates spaced apart from each other; a driving unit formed on a top surface of the first substrate; a reflective layer, acting as a first electrode to which a voltage is applied by the driving unit, disposed above the driving unit and reflecting incident light; a second electrode formed on a bottom surface of the second substrate; a color filter layer disposed between the reflective layer and the second electrode; and/or a polymer dispersed liquid crystal (PDLC) layer disposed between the reflective layer and the second electrode.

According to example embodiment, a method of manufacturing a reflective display device may include forming a driving unit on a first substrate, and forming a passivation layer to cover the driving unit; forming a reflective layer on the passivation layer; disposing a second substrate, on which an electrode is formed, to be spaced apart from the first substrate; disposing a color filter layer between the reflective layer and the electrode; disposing a mixed solution, comprising liquid crystals and photopolymerizable material, between the reflective layer and the electrode; and/or forming a polymer dispersed liquid crystal (PDLC) layer by irradiating the mixed solution with ultraviolet rays.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION

Figure 1:
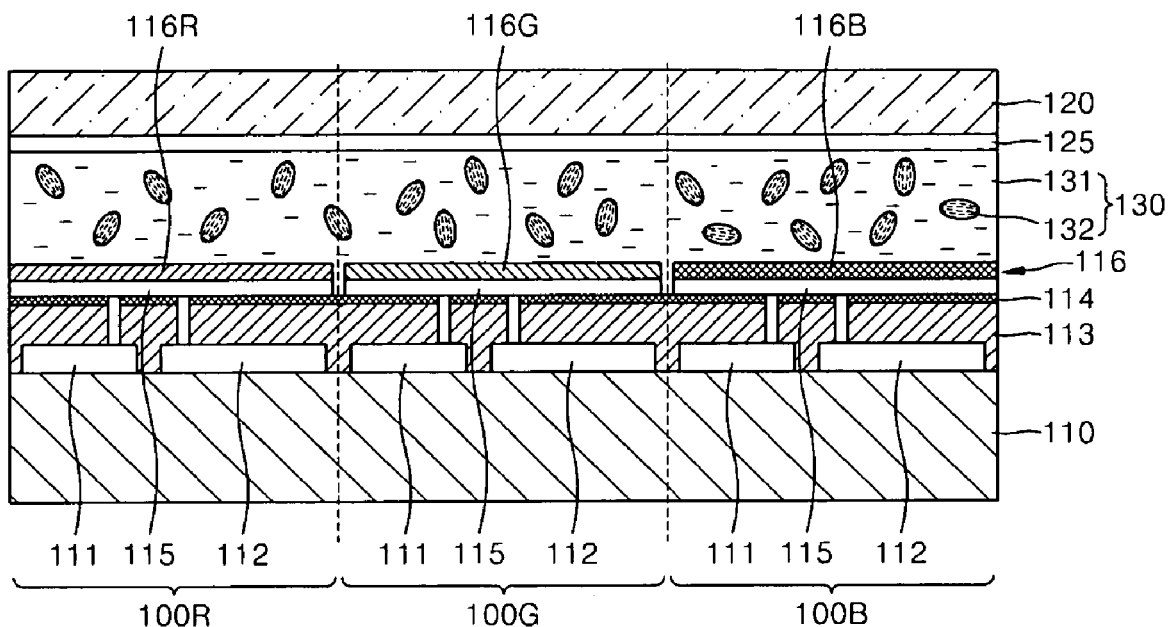
FIG. 1 is a cross-sectional view schematically illustrating a reflective display device according to example embodiments.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions are exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

In example embodiments, each pixel of a display device may include red, green, and/or blue sub-pixels. However, example embodiments are not limited to red, green and/or blue sub-pixels. In other words, each pixel may include, for example, yellow, magenta, and/or cyan sub-pixels, or sub-pixels of one or more other colors.

FIG. 1 is a cross-sectional view schematically illustrating a reflective display device according to example embodiments. FIG. 1 illustrates a cross section of a pixel of the reflective display device, for convenience of description.

Referring to FIG. 1, a driving unit, reflective layer 115, and/or color filter layer 116 may be sequentially formed on first substrate 110. First substrate 110 may be a lower substrate. First substrate 110 may be a transparent or opaque substrate. For example, first substrate 110 may be a plastic, glass, and/or metal substrate, but is not limited thereto. When first substrate 110 is a plastic substrate, the reflective display device may be flexible. When first substrate 110 may be formed of polyimide having low optical transmittance but excellent heat resistance, the temperature of a manufacturing process of the reflective display device may be increased. When first substrate 110 may be formed of polyethylene 2,6-dicarboxyl naphthalate (PEN) having lower optical transmittance, production cost of the reflective display device may be reduced. However, a material of first substrate 110 is not limited thereto, and a plastic substrate formed of different materials may be used as first substrate 110.

The driving unit may be disposed on a top surface of first substrate 110, according to red sub-pixel 100R, green sub-pixel 100G, and/or blue sub-pixel 100B. The driving unit may include thin film transistor (TFT) 111 and/or storage capacitor 112. TFT 111 may apply voltage to reflective layer 115 acting as a pixel electrode. TFT 111 may be an organic TFT (OTFT), an amorphous silicon (a-Si) TFT, a poly-Si TFT, an oxide TFT, or any other TFT. Also, storage capacitor 112 may hold the voltage applied to reflective layer 115 so as to maintain an image.

According to example embodiments, TFT 111 and/or storage capacitor 112 may have an area large enough to occupy most of sub-pixel areas on first substrate 110. Accordingly, TFT 111 having a wide channel width and/or storage capacitor 112 having a large electrode area may be formed on first substrate 110. As such, when the channel width of TFT 111 increases, a drain current may be increased. TFT 111 may be formed in such a way that a ratio of the channel width to a channel length may be greater than or equal to about 5:1 and less than or equal to about 50:1, but the ratio is not limited thereto. When TFT 111 has a wide channel width, the reflective display device may smoothly operate even when TFT 111 having a low mobility, such as an OTFT or an a-Si TFT, may be used. Also, since storage capacitor 112 may have a large electrode area, a reflective display device having a low voltage holding ratio (VHR), such as a polymer dispersed liquid crystal display (PDLCD), may smoothly operate, and thus the display quality may be improved.

Passivation layer 113 may be formed on the top surface of first substrate 110 in order to cover TFT 111 and/or storage capacitor 112. Passivation layer 113 may be formed from many different materials, such as silicon oxide, silicon nitride, or organic materials. Reflective layer 115 may be formed on the top surface of passivation layer 113, according to each of the red, green, and blue sub-pixels 100R, 100G, and 100B. Here, reflective layer 115 is disposed on the upper part of the driving unit including TFT 111 and storage capacitor 112.

Reflective layer 115 may be formed by depositing a metal thin film on passivation layer 113. The metal thin film may be formed of aluminum (Al) or molybdenum (Mo), but is not limited thereto. Reflective layer 115 may operate as a pixel electrode to which a voltage is applied by the driving unit, while reflecting incident light. Reflective layer 115 may be electrically connected to TFT 111 and/or storage capacitor 112 through via holes formed in passivation layer 113. Uneven layer 114 may be further formed on passivation layer 113 so as to increase reflectivity and/or contrast of reflective layer 115 by scattering the incident light. Uneven layer 114 may be formed by coating a photosensitive material on the top surface of passivation layer 113, and/or patterning the photosensitive material using a photolithography process. Reflective layer 115 may be formed by depositing a metal thin film on the top surface of uneven layer 114.

Color filter layer 116 may be disposed on reflective layer 115. Red color filter layer 116R may be formed on the top surface of reflective layer 115 in red sub-pixel 100R, green color filter layer 116G may be formed on the top surface of reflective layer 115 in green sub-pixel 100G, and/or blue color filter layer 116B may be formed on the top surface of reflective layer 115 in blue sub-pixel 100B. Color filter layer 116, including red color filter layer 116R, green color filter layer 116G, and/or blue color filter layer 116B, may be formed by using a photolithography method, an inkjet printing method, or by using another method. In example embodiments, color filter layer 116 may include red color filter layer 116R, green color filter layer 116G, and/or blue color filter layer 116B, but color filter layer 116 may include color filter layers of other colors, as well. In example embodiments, color filter layer 116 may include a pigment of color (that may or may not be predetermined). In example embodiments, color filter layer 116 may include an optical crystal.

Second substrate 120 may be spaced apart from first substrate 110, above first substrate 110. Second substrate 120 may be an upper substrate. Second substrate 120 may be transparent so that ultraviolet rays penetrate through it. Second substrate 120 may be, for example, a glass substrate or a plastic substrate, but is not limited thereto. When second substrate 120 may be a plastic substrate, a flexible reflective display device may be realized. Second substrate 120 may be formed, for example, of polyether sulfone (PES) through which ultraviolet rays can penetrate. However, material for forming second substrate 120 is not limited thereto, and may be formed, for example, of different plastics. Electrode 125 may be formed on a bottom surface of second substrate 120. Electrode 125 may be transparent. Electrode 125 may be a common electrode. Electrode 125 may be formed, for example, of indium tin oxide (ITO), or other conductive material or materials.

Polymer dispersed liquid crystal (PDLC) layer 130 may be disposed between color filter layer 116 formed on first substrate 110 and transparent electrode 125 formed below second substrate 120. PDLC layer 130 may include polymer 131 and/or liquid crystals 132 uniformly dispersed in polymer 131. When an electric field is applied to PDLC layer 130, reflection indexes of polymer 131 and/or liquid crystals 132 may change, and thus light may be scattered in or penetrated through PDLC layer 130. PDLC layer 130 may be obtained, for example, by curing a solution in which a photopolymerizable material, such as a monomer or an oligomer, is mixed with liquid crystals, by irradiating ultraviolet rays into the solution.

As described above, according to example embodiments, an aperture ratio may be increased by forming reflective layer 115 acting as a pixel electrode above the driving unit, and accordingly, the reflective display device having increased reflectivity and/or contrast ratio may be realized. Also, since the channel width of TFT 111 and/or the electrode area of storage capacitor 112 may be increased, a reflective display device may be smoothly operated using TFT 111 having low mobility, and/or when the display device has a low VHR.

When first substrate 110 and second substrate 120 are plastic substrates, and TFT 111 is an OTFT, a flexible reflective display device may be easily manufactured. Also, not only a transparent substrate, but also an opaque substrate, may be used as first substrate 110 in the reflective display device having the above structure, and thus a selection range of first substrate 110 may be widened. For example, when first substrate 110 may be formed of polyimide having low optical transmittance but excellent heat resistance, a temperature of a manufacturing process may be increased. Alternately, when first substrate 110 may be formed of PEN having lower optical transmittance, manufacturing costs of the reflective display device may be reduced.

A method of manufacturing the reflective display device will now be described. FIGS. 2 through 6 are diagrams for describing methods of manufacturing the reflective display device of FIG. 1.

Figure 2:
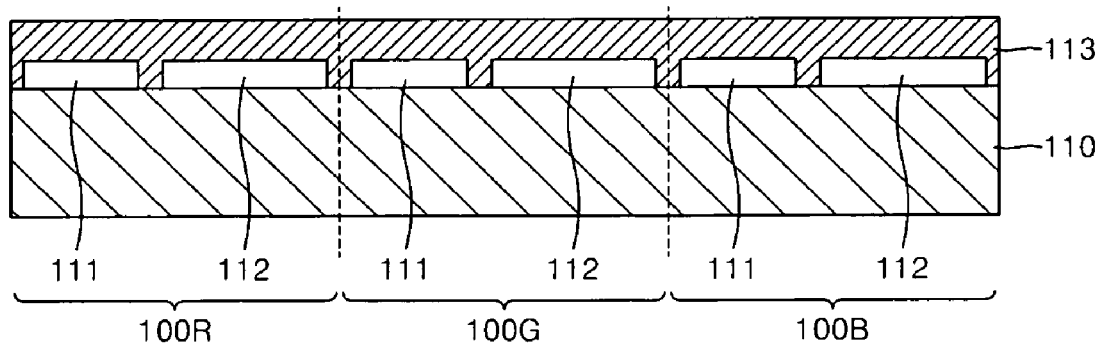
FIGS. 2 through 6 are diagrams for describing methods of manufacturing the reflective display device of FIG. 1.

Referring to FIG. 2, first substrate 110 may be prepared. Driving unit may be formed on first substrate 110, according to red sub-pixel 100R, green sub-pixel 100G, and/or blue sub-pixel 100B. First substrate 110 may be transparent or opaque, and may be formed of plastic, glass, metal, or the like. Meanwhile, when first substrate 110 is formed of plastic, a flexible reflective display device may be manufactured. First substrate 110 may be formed, for example, of polyimide having low optical transmittance but excellent heat resistance in order to increase a temperature of a manufacturing process. Alternately, first substrate 110 may be formed of PEN having lower optical transmittance in order to reduce manufacturing cost. However, a material for forming first substrate 110 is not limited thereto, and first substrate 110 may be formed of different plastics.

The driving unit may include TFT 111 and/or storage capacitor 112. TFT 111 and/or storage capacitor 112 may have a large area so as to occupy most sub-pixel areas. Accordingly, the channel width of TFT 111 may be increased and/or the electrode area of storage capacitor 112 may be increased. TFT 111 may be formed in such a way that a ratio of the channel width to a channel length may be greater than or equal to about 5:1 and less than or equal to about 50:1, but is not limited thereto. TFT 111 may be an interdigitating type, a circular type, or another type. TFT 111 may be an OTFT, an a-Si TFT, a poly-Si TFT, an oxide TFT, or any other TFT. Next, passivation layer 113 may be formed on first substrate 110 in order to cover the TFT 111 and/or storage capacitor 112. Passivation layer 113 may be formed of various materials, such as silicon oxide, silicon nitride, or organic materials.

Figure 3:
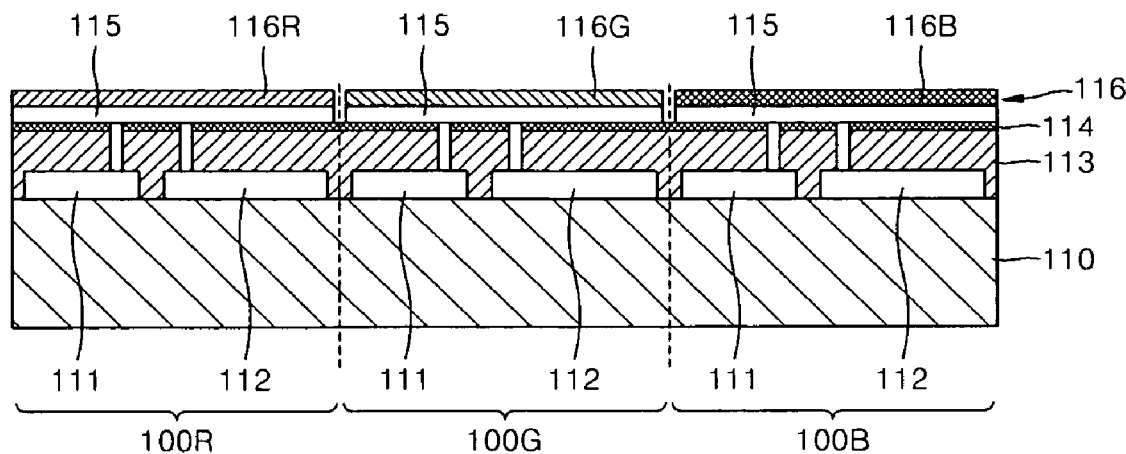

Referring to FIG. 3, reflective layer 115 may be formed on passivation layer 113 according to red sub-pixel 100R, green sub-pixel 100G, and/or blue sub-pixel 100B. Reflective layer 115 may be disposed above the driving unit including TFT 111 and/or storage capacitor 112. Reflective layer 115 may be formed by forming via holes in passivation layer 113, and then depositing a metal thin layer formed of Al or Mo on passivation layer 113 so as to fill the via holes. Reflective layer 115 may operate as a pixel electrode to which a voltage is applied by the driving unit, while reflecting incident light. Uneven layer 114 may be formed on passivation layer 113 before forming reflective layer 115. Uneven layer 114 may be formed by coating a photosensitive material on passivation layer 113, and/or patterning the photosensitive material using a photolithography method. Reflective layer 115 may be formed by depositing the metal thin film on uneven layer 114.

Color filter layer 116 may be formed on reflective layer 115. In other words, the red color filter layer 116R, green color filter layer 116G, and/or blue color filter layer 116B may be formed on reflective layer 115, respectively according to red sub-pixel 100R, green sub-pixel 100G, and/or blue sub-pixel 100B. Color filter layer 116 may be formed using a photolithography method, an inkjet printing method, or another different method. In example embodiments, color filter layer 116 may include red color filter layer 116R, green color filter layer 116G, and/or blue color filter layer 116B, but color filter layer 116 may include color filter layers with one or more different colors. In example embodiments, color filter layer 116 may include a pigment of color (that may or may not be predetermined). In example embodiments, color filter layer 116 may include an optical crystal.

Figure 4:
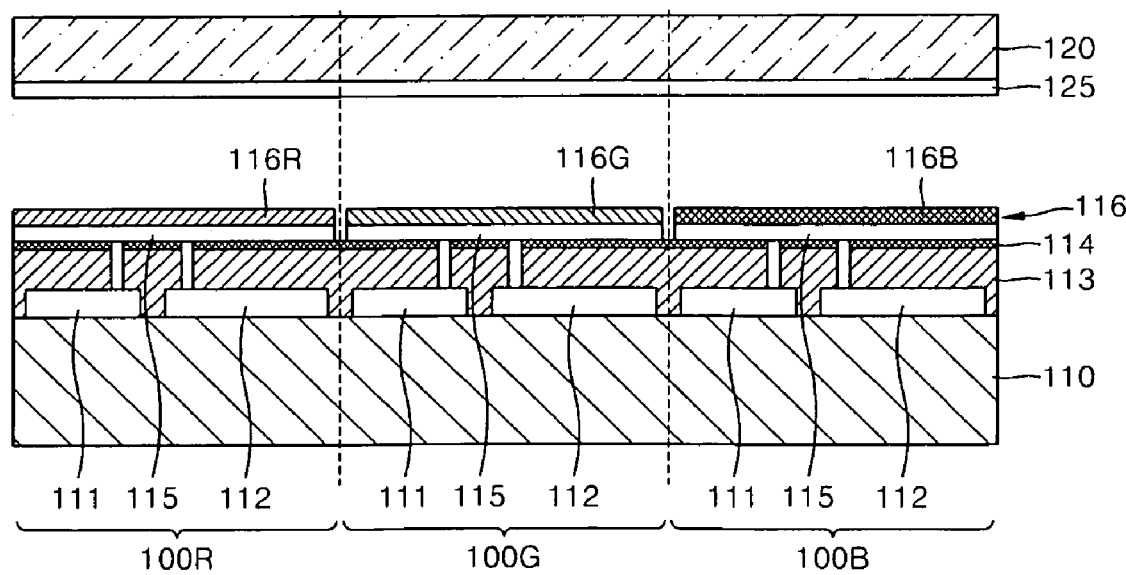

Referring to FIG. 4, second substrate 120, on which electrode 125 may be formed, may be disposed above first substrate 110 so as to be spaced apart from first substrate 110. Second substrate 120 may be a substrate through which ultraviolet rays penetrate (e.g., transparent), and may be formed, for example, of plastic or glass. When second substrate 120 may be a plastic substrate, a flexible reflective display device may be realized. Second substrate 120 may be formed of PES, but is not limited thereto. Electrode 125 may be a common electrode. Electrode 125 may be transparent. Electrode 125 may be formed of ITO or other conductive materials.

Figure 5:
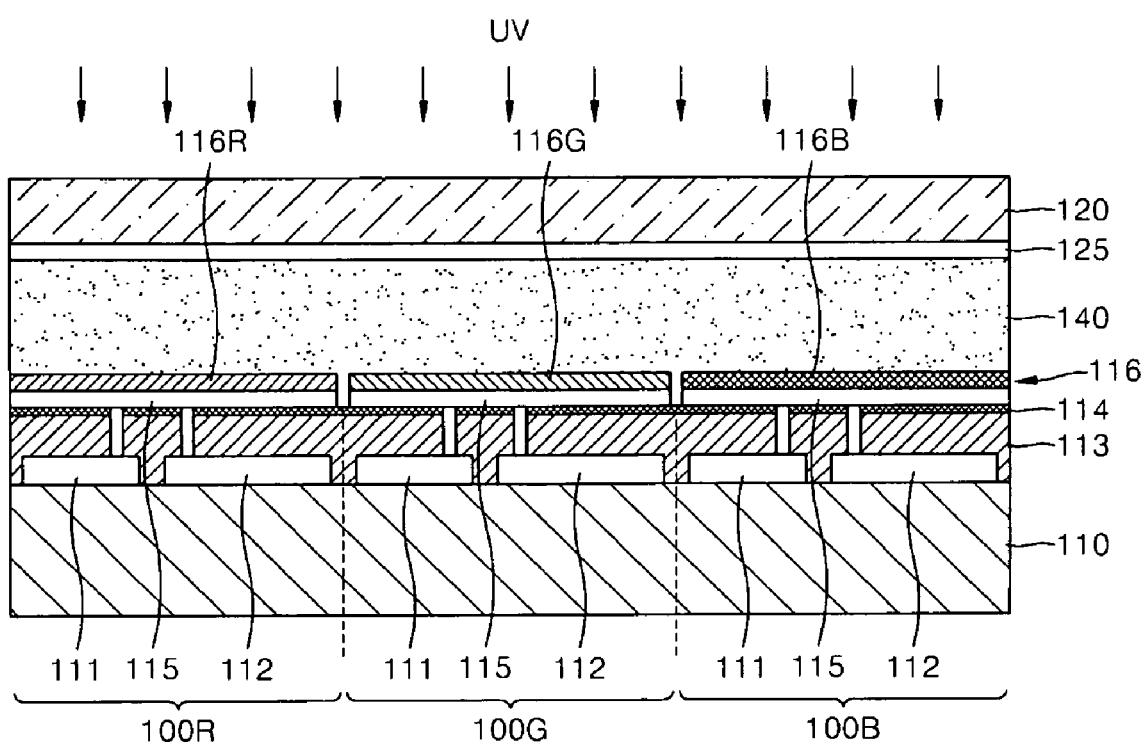

Referring to FIG. 5, mixed solution 140, including liquid crystals and a photopolymerizable material, may be filled in a space between color filter layer 116 formed on first substrate 110 and transparent electrode 125 formed below second substrate 120. The photopolymerizable material may be, for example, a monomer or oligomer. Ultraviolet rays (UV) may be irradiated from above second substrate 120 and, thus, may be transmitted to mixed solution 140 through second substrate 120 and electrode 125.

Figure 6:
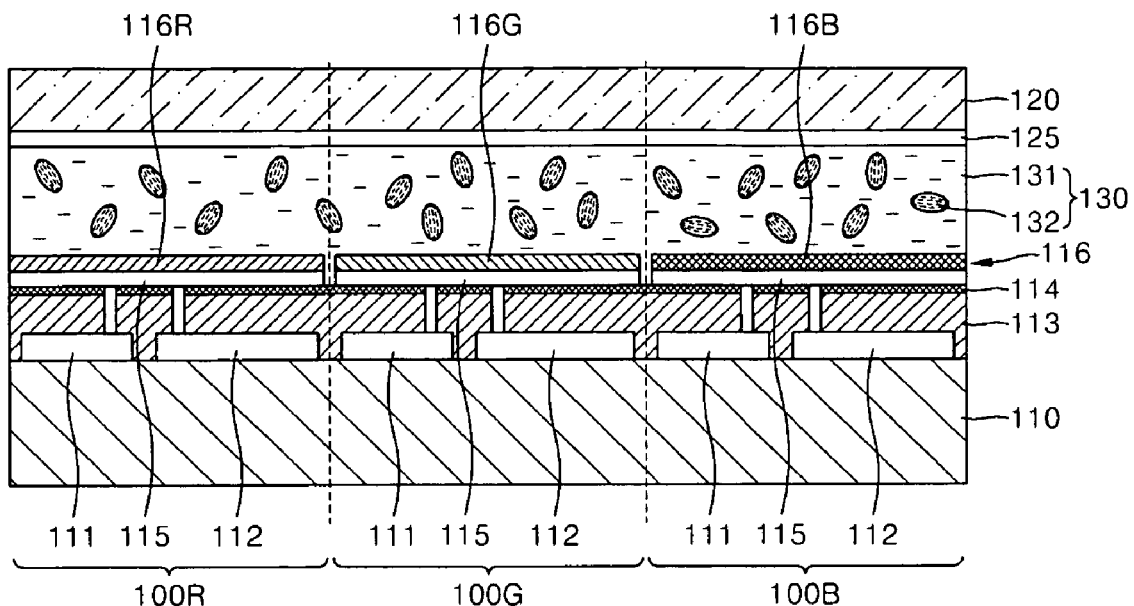

Referring to FIG. 6, mixed solution 140 may be cured by the ultraviolet rays irradiated from above second substrate 120. By curing mixed solution 140, PDLC layer 130, in which liquid crystals 132 may be uniformly dispersed in polymer matrix 131, may be formed. Accordingly, the reflective display device according to example embodiments may be manufactured.

As described above, since the ultraviolet rays are irradiated from above second substrate 120 on which only electrode 125 is formed, the ultraviolet rays may be uniformly irradiated on mixed solution 140. Accordingly, mixed solution 140 may be uniformly cured by the ultraviolet rays and, thus, PDLC layer 130 of good quality may be obtained.

When first substrates 110 and/or second substrate 120 may be plastic substrates, and/or TFT 111 may be an OTFT, a flexible reflective display device may be manufactured. Also, not only a transparent substrate but also an opaque substrate may be used as first substrate 110 in the reflective display device having the above structure. As a result, a selection range of first substrate 110 may be widened. For example, when first substrate 110 may be formed of polyimide having low optical transmittance but excellent heat resistance, a temperature of a manufacturing process may be increased. When first substrate 110 may be formed of PEN having lower optical transmittance, manufacturing costs of the reflective display device may be reduced. When second substrate 120 may be formed of PES having a large value of coefficient of thermal expansion, alignment of the reflective display device may not be affected due to thermal expansion.

Figure 7:
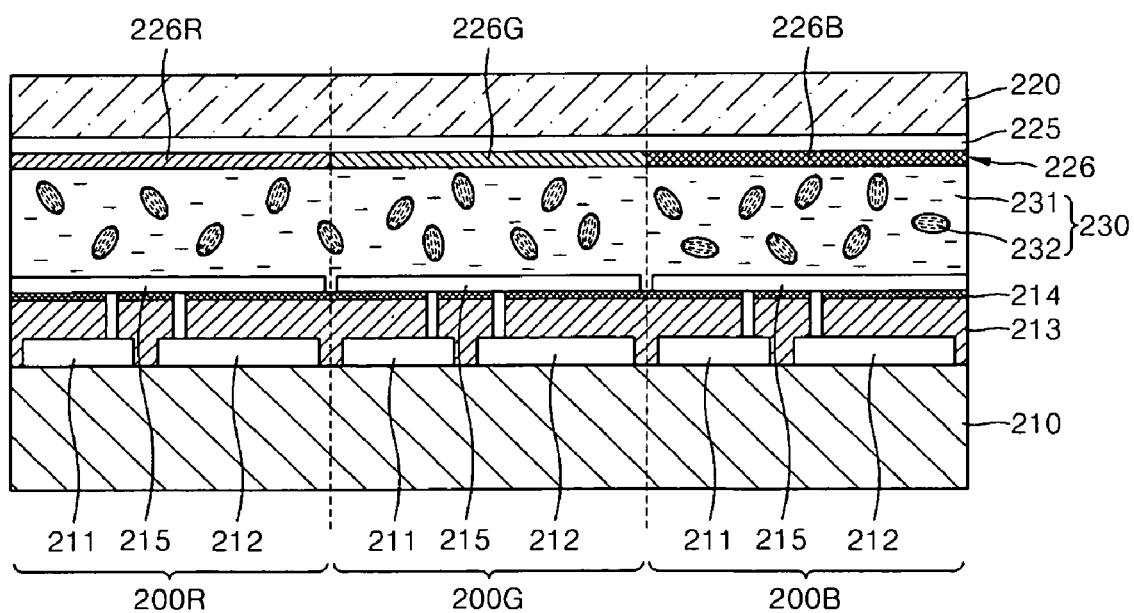
FIG. 7 is a cross-sectional view schematically illustrating a reflective display device according to example embodiments.

FIG. 7 is a cross-sectional view schematically illustrating a reflective display device according to example embodiments. For convenience of description, FIG. 7 illustrates a cross section of a pixel of the reflective display device. Hereinafter, differences between the reflective display device of FIG. 1 and the reflective display device of FIG. 7 will be mainly described.

Referring to FIG. 7, first substrate 210 and second substrate 220 may be spaced apart from each other by a distance (that may or may not be predetermined). First substrate 210 may be a lower substrate. First substrate 210 may be transparent or opaque. For example, first substrate 210 may be a plastic substrate, a glass substrate, or a metal substrate, but is not limited thereto. Second substrate 220 may be an upper substrate. Second substrate 220 may be transparent. Second substrate 220 may be a glass substrate or a plastic substrate, but is not limited thereto.

A driving unit may be disposed on the top surface of first substrate 210, according to red sub-pixel 200R, green sub-pixel 200G, and/or blue sub-pixel 200B. The driving unit may include TFT 211 and/or storage capacitor 212. TFT 211 and/or storage capacitor 212 may be formed to have an area large enough to occupy most sub-pixel areas on first substrate 210. Accordingly, TFT 211 having a large channel width and/or storage capacitor 212 having a large electrode area may be formed on first substrate 210. TFT 211 may be an OTFT, an a-Si TFT, a poly-Si TFT, an oxide TFT, or any other TFT.

Passivation layer 213 may be formed on first substrate 210 in order to cover TFT 211 and/or storage capacitor 212. Passivation layer 213 may be formed of various materials, such as silicon oxide, silicon nitride, or organic materials. Also, reflective layer 215 may be formed on passivation layer 213, according to red sub-pixel 200R, green sub-pixel 200G, and/or blue sub-pixel 200B. Reflective layer 215 may be disposed above the driving unit including TFT 211 and/or storage capacitor 212.

Reflective layer 215 may be formed by depositing a metal thin film on passivation layer 213. The metal thin film may be formed of Al or Mo, but is not limited thereto. As such, reflective layer 215 formed of the metal thin film may operate as a pixel electrode to which a voltage may be applied by the driving unit, while reflecting incident light. Reflective layer 215 may be electrically connected to TFT 211 and/or storage capacitor 212 through via holes formed in passivation layer 213. Uneven layer 214 may be formed on passivation layer 213 so as to increase the reflectivity and/or contrast of reflective layer 215, by scattering incident light. Uneven layer 214 may be formed by coating a photosensitive material on passivation layer 213 and/or patterning the photosensitive material by using a photolithography method. Reflective layer 215 may be formed by depositing the metal thin film on uneven layer 214.

Electrode 225, which may be transparent, may be formed on a bottom surface of second substrate 220. Electrode 225 may be formed of ITO, or other different conductive material or materials. Also, color filter layer 226 may be formed on a bottom surface of electrode 225. For example, red color filter layer 226R, green color filter layer 226G, and/or blue color filter layer 226B may be formed on the bottom surface of electrode 225, according to the red, green, and blue sub-pixels 200R, 200G, and 200B. According to example embodiments, color filter layer 226 may include a pigment of color (that may or may not be predetermined), but is not limited thereto. Color filter layer 226 may include an optical crystal. Also, PDLC layer 230 may be disposed between reflective layer 215 formed on first substrate 210 and color filter layer 226 formed below second substrate 220. PDLC layer 230 may include polymer matrix 231 and/or liquid crystals 232 uniformly dispersed in polymer matrix 231.

Color filter layer 226 of example embodiments may be formed on second substrate 220 acting as an upper substrate, instead of on first substrate 210 acting as a lower substrate. Also, in example embodiments, a pixel electrode may be disposed above the driving unit and, thus, an aperture ratio may be increased, the channel width of TFT 211 may be increased, and/or the electrode area of storage capacitor 212 may be increased.

As described above, according to example embodiments, an aperture ratio may be increased by disposing a reflective layer acting as a pixel electrode above a driving unit. Also, since a channel width of a TFT may be increased, a reflective display device having excellent operating performance may be manufactured even by using a TFT having low mobility. In addition, since an electrode area of a storage capacitor may be increased, the display quality may be improved by smoothly operating a reflective display device having a low VHR, such as a PDLCD.

While example embodiments have been particularly shown and described, it will be understood by those of ordinary skill in the art that various changes in form and details may be made therein without departing from the spirit and scope of the present invention as defined by the following claims.

What is claimed is:

1. A reflective display device, comprising:
    a plurality of pixels, each of the plurality of pixels comprising a plurality of sub-pixels;
    wherein each of the plurality of sub-pixels comprises:
        first and second substrates spaced apart from each other;
        a driving unit formed on a top surface of the first substrate;
        a reflective layer, acting as a first electrode to which a voltage is applied by the driving unit, disposed above the driving unit and reflecting incident light;
        a second electrode formed on a bottom surface of the second substrate;
        a color filter layer disposed between the reflective layer and the second electrode; and
        a polymer dispersed liquid crystal (PDLC) layer disposed between the reflective layer and the second electrode;
    wherein the color filter layer is formed on the reflective layer, and
    wherein the PDLC layer is disposed between the color filter layer and the second electrode.

2. The reflective display device of claim 1, wherein a passivation layer is formed on the first substrate to cover the driving unit, and
    wherein the reflective layer is formed on the passivation layer.

3. The reflective display device of claim 1, wherein the reflective layer is a metal thin film.

4. The reflective display device of claim 1, wherein the second electrode is a transparent electrode.

5. The reflective display device of claim 2, wherein an uneven layer is formed on a top surface of the passivation layer, and
    wherein the reflective layer is formed on the uneven layer.

6. The reflective display device of claim 1, wherein the driving unit comprises:
    a thin film transistor (TFT); and
    a storage capacitor.

7. The reflective display device of claim 6, wherein the TFT is an organic TFT, an amorphous silicon TFT, a polysilicon TFT, or an oxide TFT.

8. The reflective display device of claim 1, wherein the first substrate is a transparent or opaque substrate, and
    wherein the second substrate is a transparent substrate through which ultraviolet rays penetrate.

9. The reflective display device of claim 1, wherein the first substrate is a plastic substrate,
    wherein the second substrate is a plastic substrate, and
    wherein the driving unit comprises an organic thin film transistor (TFT).

10. A method of manufacturing a reflective display device, the method comprising:
    forming a driving unit on a first substrate, and forming a passivation layer to cover the driving unit;
    forming a reflective layer on the passivation layer;
    disposing a second substrate, on which an electrode is formed, to be spaced apart from the first substrate;
    disposing a color filter layer between the reflective layer and the electrode;
    disposing a mixed solution, comprising liquid crystals and photopolymerizable material, between the reflective layer and the electrode; and
    forming a polymer dispersed liquid crystal (PDLC) layer by irradiating the mixed solution with ultraviolet rays;
    wherein disposing the color filter layer between the reflective layer and the electrode includes forming the color filter layer on the reflective layer, and
    wherein disposing the mixed solution between the reflective layer and the electrode includes filling a space between the color filter layer and the electrode with the mixed solution.

11. The method of claim 10, wherein the electrode is a transparent electrode.

12. The method of claim 10, wherein the ultraviolet rays are irradiated from an upper portion of the second substrate.

13. The method of claim 10, wherein the second substrate is a transparent substrate through which the ultraviolet rays penetrate.

14. The method of claim 10, wherein the first substrate is a plastic substrate,
    wherein the second substrate is a plastic substrate, and
    wherein the driving unit comprises an organic thin film transistor (TFT).

15. The method of claim 10, wherein the reflective layer is formed by depositing a metal thin film on a top surface of the passivation layer.

16. The method of claim 10, further comprising:
    forming an uneven layer on a top surface of the passivation layer before forming the reflective layer.

* * * * *